P. NIELSEN.
MACHINE TO MAKE TUBES FROM METAL STRIPS.
APPLICATION FILED MAR. 4, 1918.
1,323,717.
Patented Dec. 2, 1919.
2 SHEETS—SHEET 1.
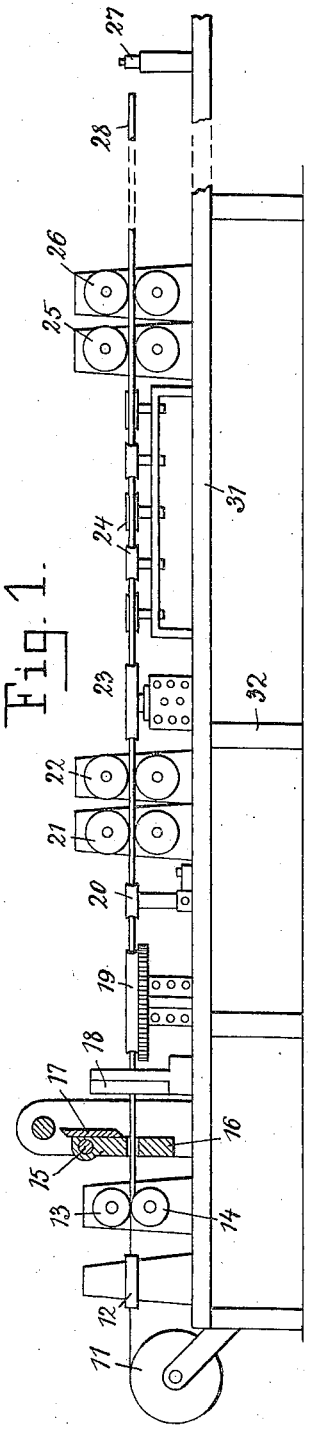
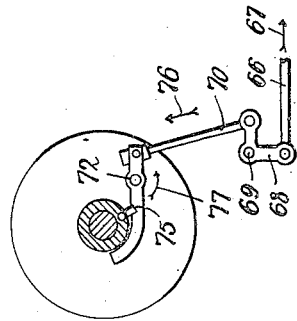
Inventor:
Peder Nielsen
By Knight Bros
attys

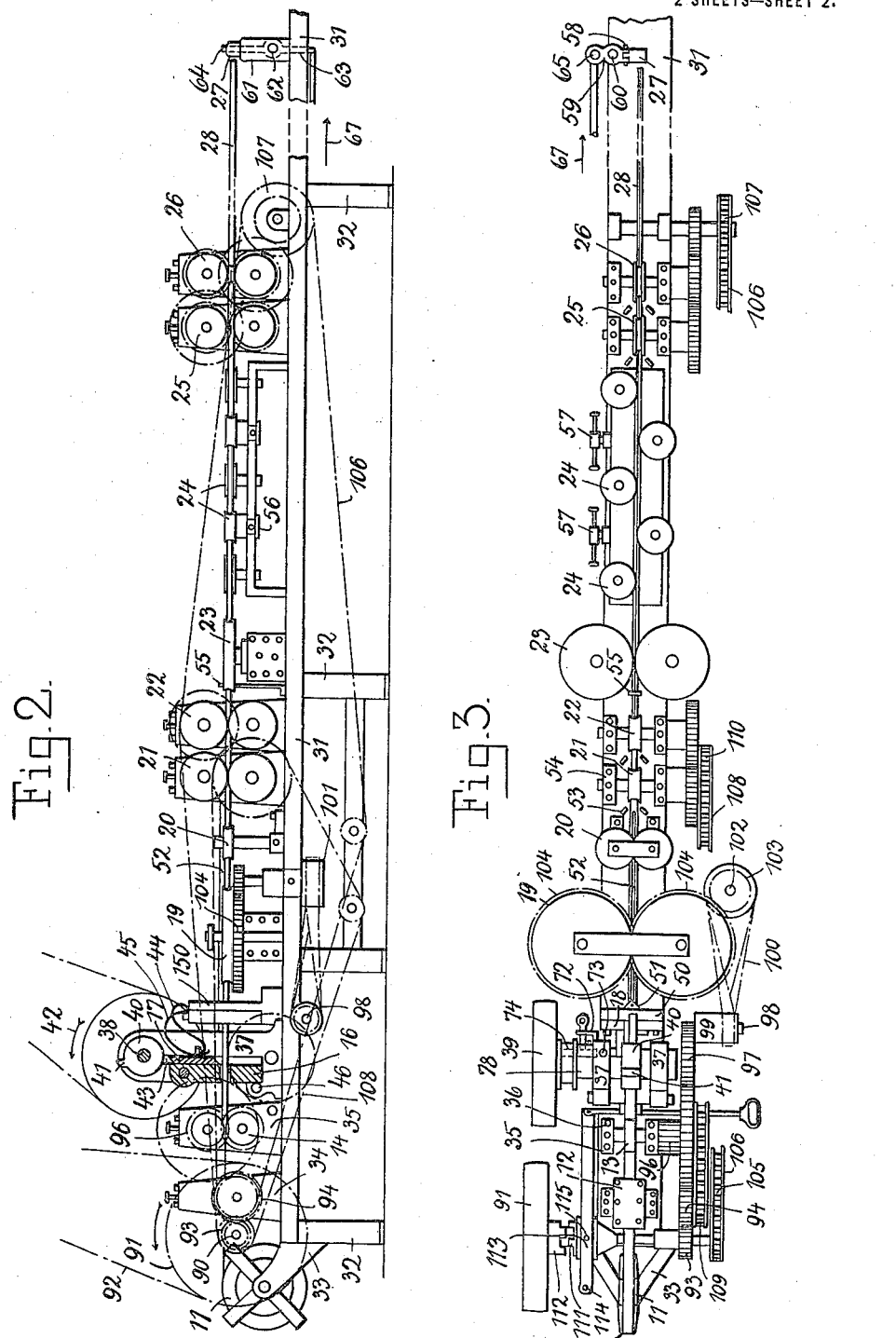

UNITED STATES PATENT OFFICE.

PEDER NIELSEN, OF BRØNDERSLEV, DENMARK.

MACHINE TO MAKE TUBES FROM METAL STRIPS.

1,323,717. Specification of Letters Patent. Patented Dec. 2, 1919.

Application filed March 4, 1918. Serial No. 220,244.

*To all whom it may concern:*

Be it known that I, PEDER NIELSEN, machine-builder, subject of the King of Denmark, residing at Brønderslev, Denmark, have invented certain new and useful Improvements in a Machine to Make Tubes from Metal Strips, of which the following is a specification.

The invention consists in a machine to produce metal tubes from flat strips taken from a hasp. The strip advances automatically through bending rolls shaping it into a tube and the machine is fitted with devices for cutting the tubes into fixed lengths. Machines of this nature have been known heretofore where the strip is passed forward automatically and closed up into shape of a tube by means of bending rolls, but in these machines the cutting off has heretofore been effected by means of a saw placed on a sliding carriage arranged to follow the continuously forward moving tube during the time required to make the cut. According to the present invention, the tubes are divided into fixed lengths by shearing and, in order that this may be done, the strip must be sheared before it has taken shape of a tube, as otherwise it would be flattened by the shearing. This shearing is therefore performed when the strip has been bent so much that its cross-section is shaped about like a half circle or a smaller part of a circle.

The duration of the shearing itself is only a fraction of a second, and the necessary motion of the shears during the operation is thereby rendered quite short, only a few millimeters. This mobility of the shears is attained by having them hung pivoted on a bolt.

During the shearing operation, the advancing strip takes the shears along for a short distance but, immediately after the cutting, a spring or the like brings the shears back to their original position. The piece of metal strip cut off is advanced farther through the machine at a speed somewhat greater than the speed at which the strip is being unwound from the hasp, so that a contact between the strip ends sheared off cannot occur, and the strip is then, by the machine, folded together in shape of a closed tube.

One manner of constructing the invention is shown on the drawing, where—

Figure 1 shows the machine in out-line,
Fig. 2 the machine in side elevation,
Fig. 3 the same, in top-view, and
Fig. 4 a detail.

The strip is taken from a hasp 11 and passes through a guiding box 12 encircling it on all sides. Then it passes between a pair of feeding rolls 13 and 14 acting, at the same time, as a swage and imparting to the strip a cross-section like a half circle or a smaller portion of a circular arc, elliptic arc or the like. Then the strip passes the cutting-off apparatus, consisting of a knife holder 16 which hangs on a bolt 15 and wherein a knife 17 is provided, movable up and down, being guided by a pair of guides in the knife holder. The strip is introduced through an opening in the knife holder 16, the opening being shaped approximately as a half circle and corresponding exactly to the cross-sectional shape of the strip at this point in the machine. The shape of the cutting edge of the knife 17 is immaterial, but it must fit closely against the face of the knife holder 16 and, in combination with the lower edge of the opening in the knife holder 16, through where the tube blank is inserted, it must form shears adapted to cut the tube blank without altering the cross-sectional shape thereof. Then the strip passes a guiding shoe 18, a pair of pinching rolls 19, acting also as feeding rolls and, finally, one more pair of pinching rolls 20. The tube has now been closed almost entirely around a stationary mandrel. Then the tube passes between two sets of vertically arranged pinching rolls 21 and 22 and two horizontally placed pinching rolls 23. The cross-section of the tube is now completely circular, but the tube itself, owing to internal tensions in the material, is generally not quite straight and it has therefore to be straightened. This is done in a straightening apparatus consisting of a number of rolls 24, forcing the tube to move in a zigzag line. Now the tube passes two sets of feeding rolls 25 and 26, whereafter it has assumed its final shape. At the end of the machine, there is placed an adjustable stop 27 which is hit by the end 28 of the tube, turning the stop sidewise while moving forward. This motion of the stop 27 is transmitted through suitable members to the shears 16, 17 which is thereby coupled to the motive power and cuts the strip.

One feature of the invention consists in severing the strip between the bending and folding rollers, that is to say, after it has been bent into semi-circular shape in cross-section, with the edges presented toward the shearing device. At this time the strip is in such form as to enable it to be severed by a shearing device, otherwise, if the shearing device acted upon the strip after it had been folded into a tube it would tend to crush or flatten it. Furthermore, if the strip were severed before it passed the bending rollers it would be more or less difficult to work the same into a tube.

The mechanical arrangement of this machine appears from Figs. 2 and 3.

The frame of the machine consists of a long table 31, supported on legs 32. At the end of the frame there is provided a bracket 33 adapted to support the hasp 11. The guiding box 12 is placed between two posts 34 in such a manner that it may be adjusted up and down as well as sidewise. The bend rolls 13 and 14 are placed between two brackets 35, and the shaft of the upper bend roll 13 is journaled in bearings adapted to be raised and lowered by means of screws 36, so that the distance between the bend rolls may be adjusted according to the thickness of the metal strip. The bolt 15, on which the cutting-off device is hung, connects two stands 37, forming at top the bearings for a shaft 38. On this shaft there is provided a loose pulley 39, adapted to be connected to the shaft 38, by means of a coupling, in such a manner that the pulley, when the coupling is operating, turns the shaft one revolution which takes place when the tube end 28 actuates the stop 27, whereafter the coupling is released automatically. On the shaft 38 there is provided a disk 40 with a cam 41, actuating when the shaft 38 revolves in the direction of the arrow 42 shown in Fig. 2, a projection 43 on the knife 17, so that the latter is depressed while sliding in the guides on the knife-holder 16. The knife 17 is normally held in its upper position by a spring 44, pressing against the lower face of a lug provided on the knife. When the cam 41, by the revolution of the shaft 38, has depressed the knife 17 and, thereby, has severed the metal strip fed forward through a slot in the knife-holder 16, the spring 44 will, immediately thereafter, lift the knife 17 up to its upper position, so that the strip has, once more, free passage through the knife-holder 16. A spring 45 presses against the side of the knife-holder 16 and holds it tightly against a fixed stop 46. During the shearing of the strip the latter, moving continuously forward, will turn the knife-holder 16 about the bolt 15 as a fulcrum, so that it is removed slightly from the stop 46 whereby the spring 45 is tightened. When the knife 17, after the shearing is finished, is lifted into its normal position by the spring 44, the spring 45 will push the knife-holder 16 back to the stop 46.

Then the strip passes a guiding shoe 18, fastened to a post 50 fitted with a hole through which the strip passes. Immediately above the strip there is fastened to the post 50 a mandrel 51 and, on the upper side of the latter, there is provided a longitudinal rib 52. The pinching rolls 19, with a semicircular groove along their edge corresponding to the dimension of the tube to be formed, now bend the strip together around the mandrel 51, and the vertical rib 52 extends through the slot in the tube thus formed, so that the tube maintains its position with the slot pointing upward. Then the tube passes two smaller pinching rolls 20, once more pressing it together around the mandrel 51 whose diameter at this point is somewhat smaller, the mandrel being slightly tapered in the direction of the forward movement of the tube. The rolls 19 and 20 are mounted adjustably, so that their pressure against the tube may be modified as desired.

After having left the mandrel 51, the tube is fed between two guides 53 to the vertical pinching rolls 21 provided between two brackets 54, the upper one of these rolls being adjustable up and down as required. These rolls serve both to improve the shape of the tube and to feed it forward. The speed of the forward motion of the tube sheared off is somewhat greater than the speed of the strip being unwound from the hasp 11, so that the rear end of the tube and the front end of the strip cannot come into contact any more. Immediately thereafter, the tube passes the rolls 22 arranged in exactly the same manner as described in case of the rolls 21. Then the tube passes a fixed guiding shoe 55 directing it into a pair of horizontal pinching rolls 23 which are adjustable like the other rolls mentioned, so that their pressure against the tube may be adjusted as desired.

The straightening apparatus consists of the five rolls 24, three of which, being placed on one side of the tube, are fastened to the frame 31 while the two others, being placed on the opposite side of the tube, are fastened to carriages 56 which may be moved toward the tube and away from it by turning handles 57. After being straightened in this manner, the tube passes two sets of feeding rolls 25 and 26 arranged exactly in the same manner as specified for the rolls 21 and 22. When the end of the tube has reached the movable stop 27 this latter, as explained above, causes the cutting-off apparatus 16, 17 to enter into action.

By means of a hinge 58, the stop 27 is fastened to a lever 59 of the first order, fulcrumed about a pin 60 on a post 61 provided on the frame 31. This post carries, on its side, a pin 62 being the fulcrum for another lever 63 of the first order, the upper end 64 of this lever passing through an aperture 65 in the lever 59. A pressure of the tube end 28 against the stop 27 will be transmitted through the levers 59 and 63 and cause a pull in a draw-bar 66 in the direction of the arrow 67, the draw-bar 66 being attached to the lower end of the lever 63.

The draw-bar 66 extends along the frame 31 to the shearing device 16, 17. Here it is attached, as shown in Fig. 4, to one end of a bell-crank lever 68, fulcrumed about a pin 69, fastened to the frame, the other end of this lever being connected, by means of a draw-bar 70, to a double-armed lever 71 having for its fulcrum a pin 72, fastened on one of the brackets 37. The other end of the lever 71, coöperates with a pin 74, actuated by a spring 73, Fig. 3, this pin being fitted with a projecting nose 75, resting against the lever 71. The pin 74 is placed parallel with the shaft 38 in a bushing 78 encircling the latter. When a pull is exerted in the draw-bar 66, in the direction of the arrow 67 in Fig. 4, the draw-bar 70 will be moved in the direction of the arrow 76, and the lever 71 will be turned in the direction of the arrow 77, whereby its free end passes clear of the nose 75 on the pin 74, and the spring 73 will now move the pin 74 toward the pulley 39, where it is caught by a lug fixed on the pulley. The pulley 39 and the shaft 38 become thereby coupled together, and the shaft 38 partakes now of the rotation of the pulley 39. When the shaft 38 has finished one revolution, the wedge-shaped end of the lever 71 having, in the meantime, returned into its original position, will wedge itself between the nose 75 and a flange provided on the bushing 78, whereby it causes the pin 74 to be withdrawn from the pulley 39, so that the coupling is released.

The motive power is transmitted to the machine in the following manner:

On a shaft 90 there is placed a pulley 91 connected, by means of a bolt 92, to the main shaft of a motor. A gear-wheel 93 transmits the motion to another gear-wheel 94, transmitting, in its turn, the motion to a gear-wheel 95 on the shaft of the roll 13. A smaller gear-wheel 96 on the same shaft transmits the motion to a gear-wheel on the shaft of the roll 14. From the gear-wheel 95, the motion is further transmitted to a pinion on a shaft 98. On this shaft there is provided a pulley 99 connected, by means of a belt 100 to a horizontal pulley 101 on a shaft 102. On the latter there is provided a gear-wheel 103, engaging a gear-wheel 104 in fixed connection with one of the pinching rolls 19. On the other pinching roll there is provided a gear-wheel of same size as the gear-wheel 104 and engaging the same.

On the shaft 90 is placed a chain-wheel 105 from where a chain 106 transmits the motion to a chain-wheel 107 whence the motion is transmitted, through suitable gear-wheels, to the pairs of pinching rolls 25 and 26. Another chain 108 connects a chain-wheel 109, provided on the same shaft as the gear-wheel 94, with a chain-wheel 110, from where the motion is transmitted, also by a gear connection to the pairs of pinching rolls 21 and 22.

The motive power required to shear the strip is taken directly, as mentioned above, by means of the pulley 39, from the main shaft of a motor.

The pulley 91 is mounted loosely on the shaft 90, and may be coupled to and uncoupled from the same by means of a coupling. On the shaft 90 there is provided a toothed sleeve 111, free to slide along the shaft, but not to turn in relation to the shaft. In connection with the pulley 91 there is provided a similar toothed ring 112, and the coupling is performed by the sleeve 111 being moved along the shaft 90 until the two toothed rings engage one another. This movement is effected by means of a lever 113, adapted to turn about a fixed pin 114, and being fitted with a pin 115, engaging a slot in the sleeve 111. The lever 113 may be moved by means of a handle 116.

Having now particularly described and ascertained the nature of my said invention and in what manner the same is to be performed, I declare that what I claim is:

1. In a tube-making machine, means for supplying a continuous strip of material, comprising a plurality of bending rollers, said rollers adapted to bend the strip into semi-circular shape in cross-section, a shearing device means for folding the strip thus formed into a tube, comprising a plurality of folding rollers, an abutment on the machine adapted to be actuated by the end of the strip and coöperating with said shearing device for severing the strip at predetermined intervals, said shearing device positioned to act upon the strip between the folding rollers and the bending rollers.

2. In a tube-making machine, means for supplying a continuous strip of material, comprising a plurality of bending rollers, said rollers adapted to bend the strip into semi-circular shape in cross-section, a shearing device means for folding the strip thus formed into a tube, comprising a plurality of folding rollers, an abutment on the machine adapted to be actuated by the end of the strip and coöperating with said shearing device for severing the strip at predetermined intervals, said shearing device comprising a vertically reciprocating knife adapted to reciprocate in the path of the strip and act upon the upturned edges of the strip after the same has passed the bending rollers.

3. In a tube-making machine, means for supplying a continuous strip of material, a plurality of bending rollers adapted to bend the strip into semi-circular shape, means for folding the strip thus formed into a tube, a shearing device, means actuated by the end of the strip and coöperating with the shearing device for severing the strip at predetermined intervals, said shearing device being positioned between the bending rollers and the folding rollers, and said strip end actuating means positioned a distance from the shearing device of substantially that of the length of the tube to be produced.

In testimony whereof the foregoing specification is signed in the presence of two witnesses.

PEDER NIELSEN.

Witnesses:
JULIUS LEHMANN,
CARL HEMMINGSEN.